United States Patent
Fu et al.

(10) Patent No.: US 10,018,177 B2
(45) Date of Patent: Jul. 10, 2018

(54) CONTROL SYSTEM AND METHOD FOR MITIGATING ROTOR IMBALANCE ON A WIND TURBINE

(71) Applicant: GENERAL ELECTRIC COMPANY, Schenectady, NY (US)

(72) Inventors: Xu Fu, Shanghai (CN); Lihan He, Shanghai (CN); Hai Qiu, Shanghai (CN); Gerald Addison Curtin, Jr., Niskayuna, NY (US); Myungkeun Yoon, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 854 days.

(21) Appl. No.: 14/477,950

(22) Filed: Sep. 5, 2014

(65) Prior Publication Data

US 2015/0086362 A1 Mar. 26, 2015

(30) Foreign Application Priority Data

Sep. 23, 2013 (CN) .......................... 2013 1 0435662

(51) Int. Cl.
*F03D 7/02* (2006.01)
*F03D 7/04* (2006.01)
*F03D 17/00* (2016.01)

(52) U.S. Cl.
CPC ........... *F03D 7/0224* (2013.01); *F03D 7/024* (2013.01); *F03D 7/045* (2013.01); *F03D 17/00* (2016.05);
(Continued)

(58) Field of Classification Search
CPC ........ F03D 7/0224; F03D 7/024; F03D 7/042; F03D 7/045; F05B 2270/32; F05B 2270/807
See application file for complete search history.

(56) References Cited

U.S. PATENT DOCUMENTS

| 4,189,648 A | * | 2/1980 | Harner | F03D 7/0224 290/44 |
| 5,648,782 A | * | 7/1997 | Albo | G01S 13/951 342/26 D |

(Continued)

FOREIGN PATENT DOCUMENTS

| WO | 2010086688 A1 | 8/2010 |
| WO | 2013110215 A1 | 8/2013 |

OTHER PUBLICATIONS

Web Article, on SPIE web page, Inertial measurements monitor wind turbines in action, SPIE Newsroom, DOI: 10.1117/2.1200908. 1748., Aug. 13, 2009.

(Continued)

*Primary Examiner* — Matthew P Travers
(74) *Attorney, Agent, or Firm* — Douglas D. Zhang; GE Global Patent Operation

(57) ABSTRACT

A wind turbine includes a rotor comprising multiple blades mounted on a hub, MIMUs mounted on each blade for sensing parameter signals thereof, and a control system. The control system includes a wind speed calculation unit, a wind shear calculation unit, a pitch angle compensation command calculation unit, and a pitch control unit. The wind speed calculation unit is used for calculating wind speeds at the blades based at least on the sensed parameter signals. The wind shear calculation unit is used for calculating a characteristic shear exponent based at least on the calculated wind speeds. The pitch angle compensation command calculation unit is used for calculating pitch angle compensation commands of the blades based at least on the calculated characteristic shear exponent. The pitch control unit is used for adjusting the pitch angles of the blades based on the calculated pitch angle compensation commands.

10 Claims, 6 Drawing Sheets

(52) U.S. Cl.
CPC ..... *F05B 2270/32* (2013.01); *F05B 2270/807* (2013.01); *Y02E 10/721* (2013.01); *Y02E 10/723* (2013.01)

(56) References Cited

U.S. PATENT DOCUMENTS

| | | |
|---|---|---|
| 8,262,354 B2 | 9/2012 | Hoffmann |
| 8,310,073 B2 | 11/2012 | Enevoldsen et al. |
| 8,317,471 B2 | 11/2012 | Axelsson et al. |
| 8,360,722 B2 | 1/2013 | Hoffmann et al. |
| 8,360,724 B2 | 1/2013 | Yoshida |
| 8,376,708 B2 | 2/2013 | Patel et al. |
| 8,398,369 B2 | 3/2013 | Rebsdorf et al. |
| 8,410,625 B2 | 4/2013 | Stiesdal |
| 2009/0047116 A1 | 2/2009 | Barbu et al. |
| 2010/0014969 A1 | 1/2010 | Wilson et al. |
| 2010/0092292 A1 | 4/2010 | Nies et al. |
| 2011/0137586 A1* | 6/2011 | Jiang ............ F03D 17/00 702/56 |
| 2012/0237346 A1 | 9/2012 | Mascarell et al. |
| 2012/0303277 A1* | 11/2012 | Fu ............ F03D 17/00 702/3 |
| 2013/0156577 A1* | 6/2013 | Esbensen ......... F03D 7/043 416/1 |

OTHER PUBLICATIONS

Dunne, et al., "Adding Feedforward Blade Pitch Control to Standard Feedback Controllers for Load Mitigation in Wind Turbines", Department of Electrical, Computer, and Energy Engineering, University of Colorado, Boulder, CO, Nov. 15, 2010.

WindLift's channel, "Windlift IMU testing", https://www.youtube.com/watch?v=sBpqJOpp7-k, Oct. 13, 2011.

DK Office Action issued in connection with corresponding DK Application No. PA201470587 dated Jan. 12, 2017.

Weinzierl, "A BEM Based Simulation-Tool for WindTurbine Blades with Active Flow Control Elements", Smart Blade, Apr. 19, 2011.

Vesel Jr., "Aero-Structural Optimization of a 5 MW Wind Turbine Rotor", Partial Fulfillment of the Requirements for the Degree Master of Science in the Graduate School of the Ohio State University, pp. 1-116, 2012.

* cited by examiner

CONTROL SYSTEM AND METHOD FOR MITIGATING ROTOR IMBALANCE ON A WIND TURBINE

BACKGROUND

Embodiments of the disclosure relate generally to wind turbines and, more particularly, to mitigating rotor imbalance on wind turbines.

A utility-scale wind turbine typically includes a set of two or three large rotor blades mounted to a hub. The rotor blades and the hub together are referred to as the rotor. The rotor blades aerodynamically interact with the wind and create lift and drag, which is then translated into a driving torque by the rotor. The rotor is attached to and drives a main shaft, which in turn is operatively connected via a drive train to a generator or a set of generators that produce electric power. The main shaft, the drive train, and the generator(s) are all situated within a nacelle, which rests on a yaw system that in some embodiments continuously pivots along a vertical axis to keep the rotor blades facing in the direction of the prevailing wind current to generate maximum driving torque.

In certain circumstances, the wind direction can shift very rapidly, faster than the response of the yaw system, which can result in a yaw error which can generate rotor imbalance (or load imbalance). The rotor imbalance is due to wind shear or yaw misalignment on the operational wind turbines. During such aforementioned transient wind events, the rotor imbalance, which can be sustained for a few seconds or minutes, might damage the wind turbine if operation of the wind turbine continues. Specifically, during such operation of the wind turbine, rotor imbalance can result in unacceptably high loads on the rotor blades, hub, tower, and other components thereof, which can result in damage.

Therefore, there is a need for new and improved control systems and methods for mitigating rotor imbalance on wind turbines.

BRIEF DESCRIPTION

A wind turbine is provided. The wind turbine includes a rotor comprising multiple blades mounted on a hub, MIMUs mounted on each blade for sensing parameter signals thereof, and a control system. The control system includes a wind speed calculation unit, a wind shear calculation unit, a pitch angle compensation command calculation unit, and a pitch control unit. The wind speed calculation unit is used for calculating wind speeds at the blades based at least on the sensed parameter signals. The wind shear calculation unit is used for calculating a characteristic shear exponent based at least on the calculated wind speeds. The pitch angle compensation command calculation unit is used for calculating pitch angle compensation commands of the blades based at least on the calculated characteristic shear exponent. The pitch control unit is used for adjusting the pitch angles of the blades based on the calculated pitch angle compensation commands.

A control method for mitigating rotor imbalance on a wind turbine is provided and the rotor includes multiple blades mounted on a hub. The control method includes: calculating wind speeds at the blades based at least on sensed parameter signals from MIMUs mounted on each blade; calculating a characteristic shear exponent based at least on the calculated wind speeds; calculating pitch angle compensation commands of the blades based at least on the calculated characteristic shear exponent; and adjusting the pitch angles of the blades based on the calculated pitch angle compensation commands.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments disclosed herein relate generally to wind turbines with improved rotor imbalance compensation capabilities. As used herein, "micro inertial measurement unit (MIMU)" refers to a motion capture sensing apparatus, which can sense three dimensional (3D) orientation (pitch, roll, yaw) signals, 3D acceleration signals, 3D rate of turn signals, 3D magnetic field signals, and/or other related parameter signals in real time. The MIMUs may include at least one of or any combination of a 3D accelerometer, a 3D gyroscope, and a 3D magnetometer.

The exemplary embodiments of the improved rotor imbalance compensation capabilities described herein are based on control systems and methods which can produce pitch angle compensation commands used to compensate the generated rotor imbalance during yaw error events or due to stationary wind shear, abrupt and/or severe wind gust or wake events. The pitch angle compensation commands are calculated based on at least the sensed parameter signals from the MIMUs mounted on the rotor of the wind turbine.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items.

Figure 1:
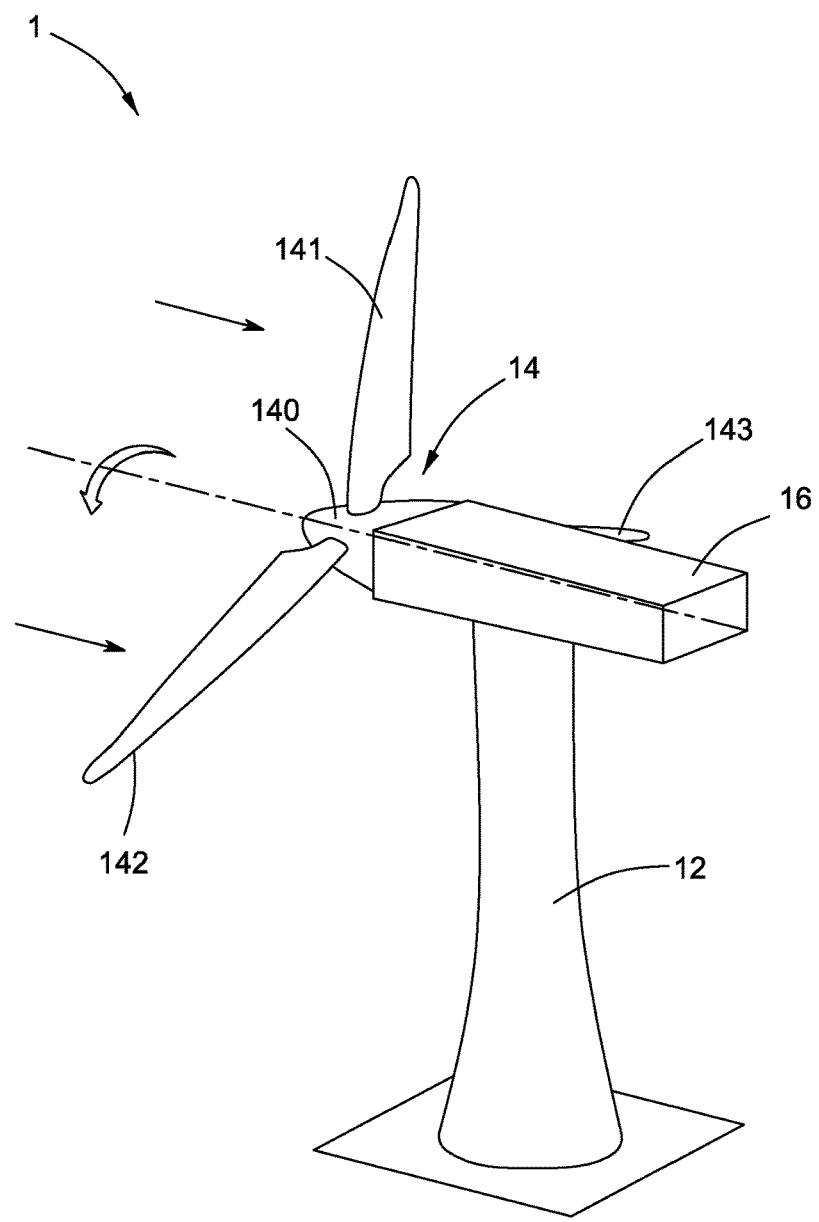
FIG. 1 is a schematic perspective side view of a wind turbine.

Referring to FIG. 1, a schematic perspective side view of an exemplary wind turbine 1 is shown. The wind turbine 1 may include a tower section 12 and a rotor 14. The rotor 14 may include blades, such as three blades 141, 142, and 143, connected to a hub 140. The blades 141, 142, and 143 may rotate with wind energy, and the rotor 14 may transfer that energy to a main shaft (not shown) situated within a nacelle 16. The nacelle 16 may optionally include a drive train (not shown), which may connect the main shaft on one end to one or more generators (not shown) on the other end. Alternatively, the generator(s) may be connected directly to the main shaft in a direct drive configuration. The generator(s) may generate power, which may be transmitted through the tower section 12 to a power distribution panel (PDP) and a pad mount transformer (PMT) for transmission to a grid (not shown). The nacelle 16 may be positioned on a yaw system, which may pivot about a vertical axis to orient the rotor 14 in the direction of the wind current. In other embodiments, the wind turbine 1 may comprise a different type of wind turbine.

Figure 2:
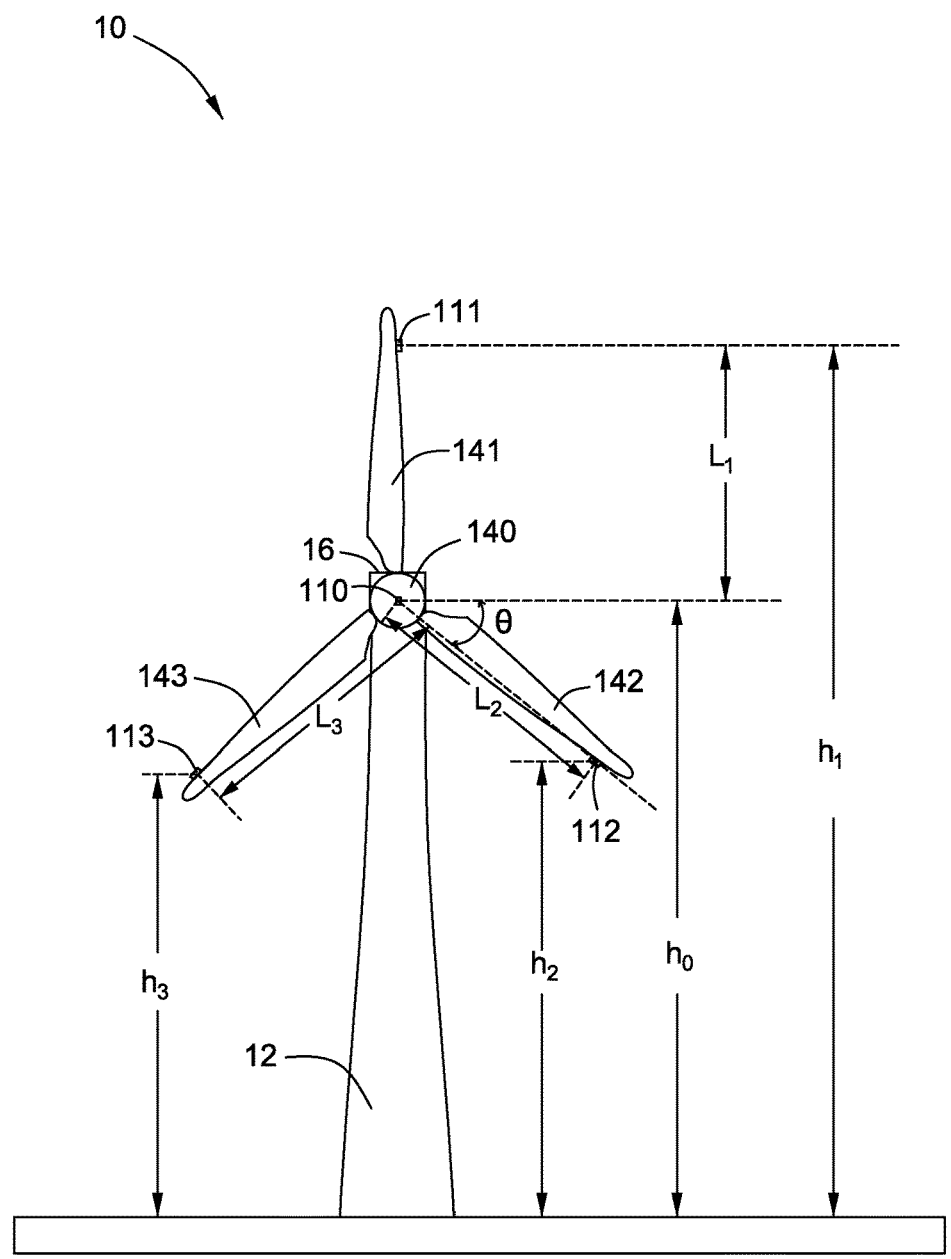
FIG. 2 is a schematic view of a wind turbine in a front facing direction including micro inertial measurement units in accordance with one embodiment of the present invention.

Referring to FIG. 2, a front facing view of a wind turbine 10 in accordance with one embodiment of the present invention is shown. In the illustrated embodiment of FIG. 2, the hub 140 includes a micro inertial measurement unit (MIMU) 110 mounted on the center of the hub 140. Each of the blades 141, 142, 143 includes a MIMU (111, 112, 113) mounted on an external wall thereof. In other embodiments, each of the MIMUs 111, 112, 113 can be mounted on an inner wall of the corresponding blade, or can be embedded in the wall of the corresponding blade. In some embodiments, the number and the positions of the MIMUs mounted on each blade can be adjusted according to design requirements or for desired results. For example, each of the blades 141, 142, and 143 can include two or more MIMUs mounted on different positions thereof, to obtain more parameter signal information. In other embodiments, other parts of the wind turbine 10, such as the tower section 12 and the nacelle 16 may also include one or more MIMUs to sense parameter signals.

Figure 3:
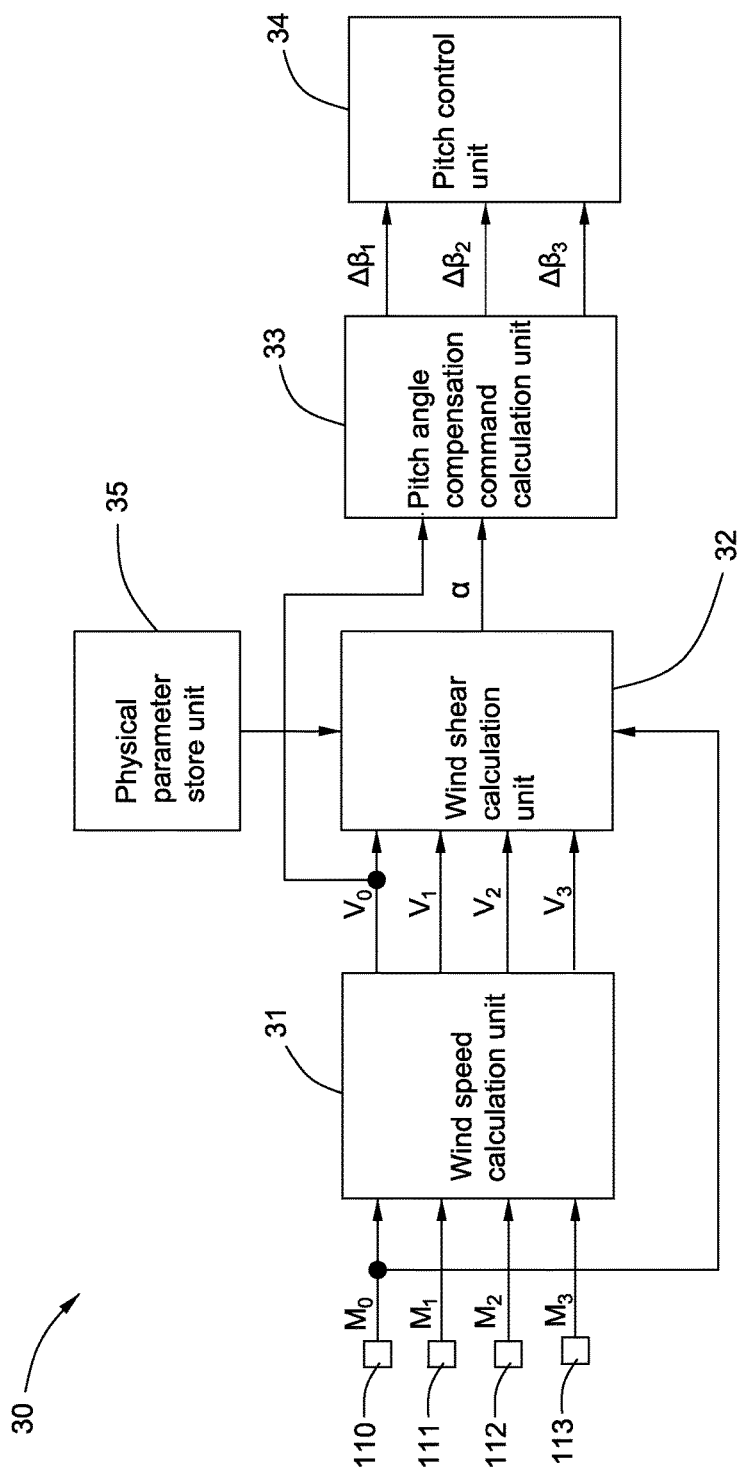
FIG. 3 is a control diagram of a control system of the wind turbine of FIG. 1, according to one embodiment of the present invention.

Referring to FIG. 3, a control diagram of a control system 30 of the wind turbine 10, according to one embodiment of the present invention is shown. In at least some embodiments, the control system 30 includes a wind speed calculation unit 31, a wind shear calculation unit 32, a pitch angle compensation command calculation unit 33, a pitch control unit 34, and a physical parameter store unit 35. In some embodiments, the control system 30 may be an individual apparatus installed in an appropriate position of the wind turbine 10. For example, the control system 30 may be installed as a separate control unit or units in the nacelle 16. In other embodiments, the control system 30 may be embedded in one or more integrated control units of the wind turbine 10.

The wind speed calculation unit 31 is used to receive parameter signals $M_0$, $M_1$, $M_2$, $M_3$ respectively sensed from the MIMUs 110, 111, 112, 113, and then calculate wind speeds $V_0$, $V_1$, $V_2$, $V_3$ respectively at the hub 140 and the three blades 141, 142, 143 based on the received parameter signals $M_0$, $M_1$, $M_2$, $M_3$. In some embodiments, the wind speed $V_0$ may be calculated by calculating an average value of the other three wind speeds $V_1$, $V_2$, $V_3$, namely $V_0=(V_1+V_2+V_3)/3$. Thus, the MIMU 110 can be omitted accordingly. In other words, the wind speed $V_0$ is a center average wind speed of the rotor 14, and the other three wind speeds $V_1$, $V_2$, $V_3$ are individual wind speeds at the MIMUs 111, 112, 113 of the blades 141, 142, 143 respectively.

Based on the MIMU's motion capture sensing functions, each of the parameter signals $M_0$, $M_1$, $M_2$, $M_3$ may include several sensed signals. As an example, the sensed parameter signals $M_0$, $M_1$, $M_2$, $M_3$ received by the wind speed calculation 31 may include acceleration signals, rotation speed signals, rotor position signals, or combinations thereof. In other embodiments, the sensed parameter signals $M_0$, $M_1$, $M_2$, $M_3$ received by the wind speed calculation 31 may include other sensed parameter signals which are related to the wind speed parameter to be calculated. Exemplary embodiments of calculating the wind speeds $V_0$, $V_1$, $V_2$, and V3 will be described in further detail below.

The wind shear calculation unit 32 is used to calculate a characteristic shear exponent α indicating the intensity of the wind shear to the rotor 14. In some embodiments, the relationship between the shear exponent α and the wind speeds $V_0$, $V_1$, $V_2$, $V_3$ can be written as follows.

$$V_1 = V_0 * (h_1/h_0)^\alpha \qquad (1)$$

$$V_2 = V_0 * (h_2/h_0)^\alpha \qquad (2)$$

$$V_3 = V_0 * (h_3/h_0)^\alpha \qquad (3)$$

Wherein, $h_0$ stands for the vertical height from the MIMU 110 to ground, $h_1$ stands for the vertical height from the MIMU 111 to ground, $h_2$ stands for the vertical height from the MIMU 112 to ground, $h_3$ stands for the vertical height from the MIMU 113 to ground (see FIG. 2). The parameters $h_1$, $h_2$, $h_3$ are dynamic parameters during operation of the wind turbine 10.

The parameter height $h_0$ is a known physical parameter of the wind turbine 10, which is stored in the physical parameter store unit 35 in the illustrated embodiment. The heights $h_1$, $h_2$, $h_3$ are variable parameters determined by the height $h_0$, the real rotor position of the rotor 14, and the distances $L_1$, $L_2$, $L_3$ between the center of the rotor 14 and each of the MIMUs 111, 112, 113. The distances $L_1$, $L_2$, $L_3$ are known physical parameters according to the MIMUs' arrangement and stored in the physical parameter store unit 35 as well. In one embodiment, the real rotor position of the rotor 14 can be sensed by the MIMU 110, for example a rotor angle θ can be sensed by the MIMU 110. In other embodiments, the real rotor position of the rotor 14 also can be sensed by other types of position sensors.

In above three equations (1), (2) and (3), $h_0$ is a known parameter, and $h_1$, $h_2$, $h_3$ can be determined by the height $h_0$, the real rotor position of the rotor 14, and the distances $L_1$, $L_2$, $L_3$. The rotor angle θ representing the rotor position of the rotor 14 can be sensed by the MIMU 110 or other position sensors. The wind speeds $V_0$, $V_1$, $V_2$, $V_3$ are determined by the wind speed calculation unit 31 based on the MIMUs' motion capture sensing functions. By using the least square algorithm or similar algorithms, the characteristic shear exponent α representing one kind of rotor imbalance information can be calculated accordingly.

The pitch angle compensation command calculation unit 33 receives the rotor imbalance information, namely the characteristic shear exponent α, and then respectively calculates three pitch angle compensation commands $\Delta\beta_1$, $\Delta\beta_2$, and $\Delta\beta_3$ according to the characteristic shear exponent α. The pitch angle compensation commands $\Delta\beta_1$, $\Delta\beta_2$, and $\Delta\beta_3$ are used to adjust pitch angles of the three blades 141, 142, and 143 respectively, to compensate the rotor imbalance thereof. In some embodiments, the relationship between the characteristic shear exponent α and the pitch angle compensation commands $\Delta\beta_1$, $\Delta\beta_2$, and $\Delta\beta_3$ are determined in advance and stored in the pitch angle compensation command calculation unit 33. In addition to the characteristic shear exponent α, the pitch angle compensation command calculation unit 33 also receives the center average wind speed $V_0$ of the rotor 14 to calculate the three pitch angle compensation commands $\Delta\beta_1$, $\Delta\beta_2$, and $\Delta\beta_3$. In some embodiments, the relationship between the center average wind speed $V_0$ and the pitch angle compensation commands $\Delta\beta_1$, $\Delta\beta_2$, and $\Delta\beta_3$ are determined in advance and stored in the pitch angle compensation command calculation unit 33.

Because the MIMUs 110, 111, 112, 113 may sense the parameter signals more quickly than any other sensors installed at other locations such as the main shaft or drive train components, the pitch angle compensation commands $\Delta\beta_1$, $\Delta\beta_2$, and $\Delta\beta_3$ may more quickly mitigate the rotor imbalance. In addition to mitigating the rotor imbalance, the pitch angle compensation commands $\Delta\beta_1$, $\Delta\beta_2$, and $\Delta\beta_3$ also may mitigate extreme loads on the blades 141, 142, 143, such as sudden high wind gust and sudden grid failure, to protect the wind turbine 10. Furthermore, the pitch angle compensation commands $\Delta\beta_1$, $\Delta\beta_2$, and $\Delta\beta_3$ also may reduce peak loads applied to pitch bearings (not shown) that would result in increasing the reliability and life of the pitch bearings. Moreover, the pitch angle compensation commands $\Delta\beta_1$, $\Delta\beta_2$, and $\Delta\beta_3$ also may limit forward and aft movement and nodding movement of the nacelle 16 to increase the life and reliability of the tower section 12 and yaw bearings (not shown), and also optimize the turbine operation by maximizing power production while mitigating the peak load on critical components (such as pitch bearings). It should be understood that, the pitch angle compensation commands $\Delta\beta_1$, $\Delta\beta_2$, and $\Delta\beta_3$ are transmitted to a pitch control unit 34 used to adjust the pitch angles of the three blades 141, 142, and 143, and thus not described in detail.

Figure 4:
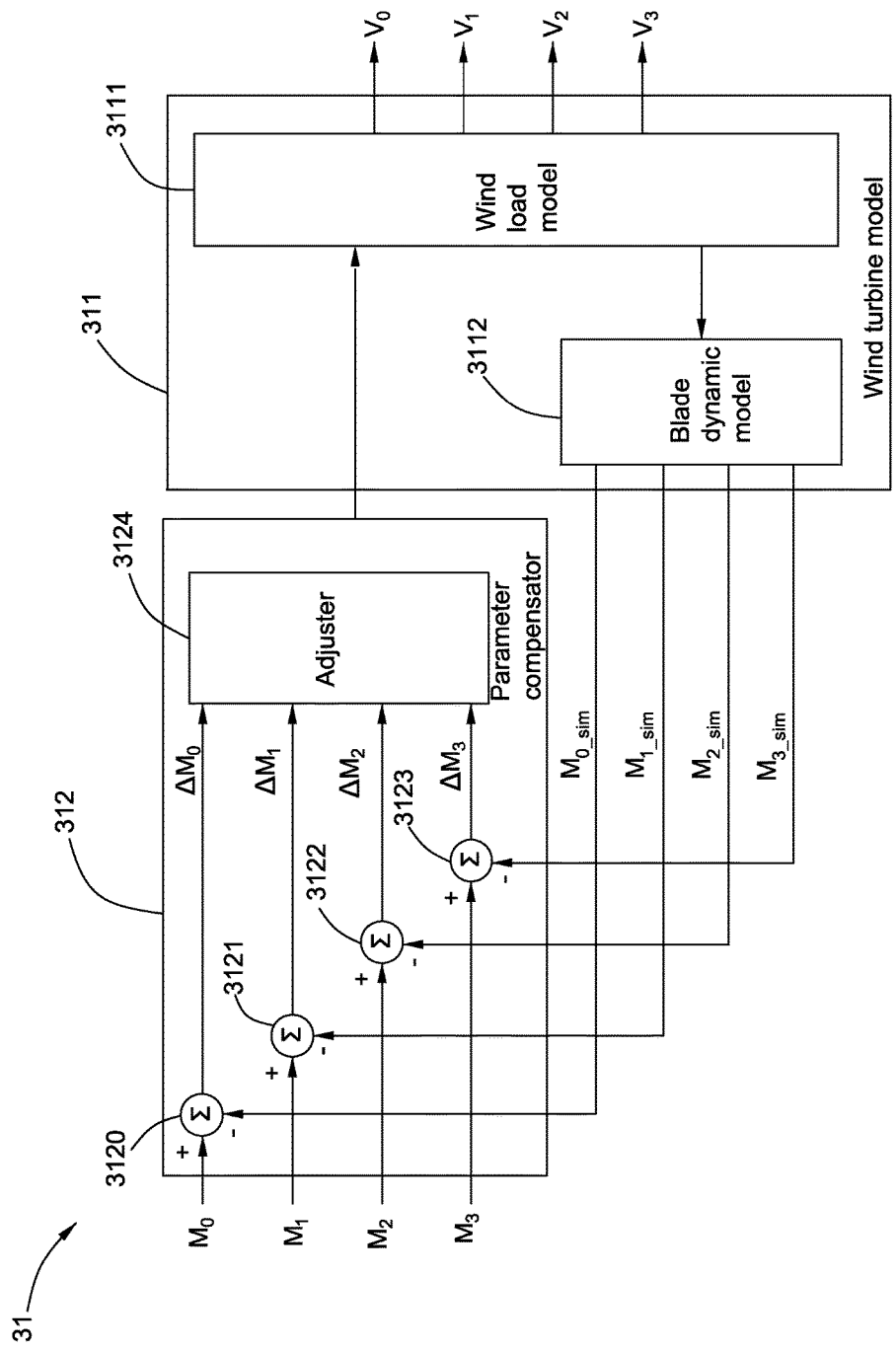
FIG. 4 is a control diagram of a wind speed calculation unit of the control system of FIG. 3, according to one embodiment of the present invention.

Referring to FIG. 4, a control diagram of the wind speed calculation unit 31, according to one embodiment is shown. The wind speed calculation unit 31 includes a wind turbine model 311 and a parameter compensator unit 312. In some embodiments, the wind turbine model 311 may comprise a physical-based model or a data-driven model, or a hybrid model such as a combination of both physical-based and data-driven models. In the illustrated embodiment, the wind turbine model 311 includes a wind load model 3111 and a blade dynamic model 3112. The wind load model 3111 is used to calculate the wind load of the wind turbine 10, and existing load modeling software can be leveraged. The blade dynamic model 3112 is used to simulate the blades 141, 142, 143 of the wind turbine 10 based on the simulation of the wind turbine model 311 by using simulation software, and generate four simulation parameter signals $M_{0\_sim}$, $M_{1\_sim}$, $M_{2\_sim}$, $M_{3\_sim}$, corresponding to the sensed parameter signals $M_0$, $M_1$, $M_2$, $M_3$ from the MIMUs 110, 111, 112, 113. In other words, the sensed parameter signals $M_0$, $M_1$, $M_2$, $M_3$ are real motion signals of the rotor 14, and the simulation parameter signals $M_{0\_sim}$, $M_{1\_sim}$, $M_{2\_sim}$, $M_{3\_sim}$ are simulation signals generated by the wind turbine model 311. As mentioned above, in one embodiment, the sensed signals $M_0$, $M_1$, $M_2$, $M_3$ includes the acceleration signals or the rotation speed signals, or the combination thereof. In other embodiments, the sensed signals $M_0$, $M_1$, $M_2$, $M_3$ may include other motion signals which are related to the wind speed parameters.

Because the sensed parameter signals $M_0$, $M_1$, $M_2$, $M_3$ are variable parameters, the wind turbine model 311 needs to be adjusted according to the real change of the sensed parameter signals $M_0$, $M_1$, $M_2$, $M_3$. The parameter compensator unit 312 includes first to fourth summation elements 3120, 3121, 3122, 3123, and an adjuster 3124. The first summation element 3120 is used to obtain an error signal $\Delta M_0$ between the sensed signals $M_0$ and the simulation parameter signals $M_{0\_sim}$; the second summation element 3121 is used to obtain an error signal $\Delta M_1$ between the sensed signals $M_1$ and the simulation parameter signals $M_{1\_sim}$; the third summation element 3122 is used to obtain an error signal $\Delta M_2$ between the sensed signals $M_2$ and the simulation parameter signals $M_{2\_sim}$; the fourth summation element 3123 is used to obtain an error signal $\Delta M_3$ between the sensed signals $M_3$ and the simulation parameter signals $M_{3\_sim}$. The adjuster 3124 is used to receive the error signals $\Delta M_0$, $\Delta M_1$, $\Delta M_2$, $\Delta M_3$ and adjust the wind turbine model 311 accordingly. Namely, the wind turbine model 311 will be adjusted according to a real change of the sensed signals $M_0$, $M_1$, $M_2$, and M3. Thus, the wind turbine model 311 can generate the four real wind speeds $V_0$, $V_1$, $V_2$, $V_3$ accordingly, which can be used to calculate the shear exponent α mentioned above. In this illustrated embodiment, the wind load model 3111 is used to generate the real wind speeds $V_0$, $V_1$, $V_2$, $V_3$ according to the adjustment of the parameter compensator 312.

Figure 5:
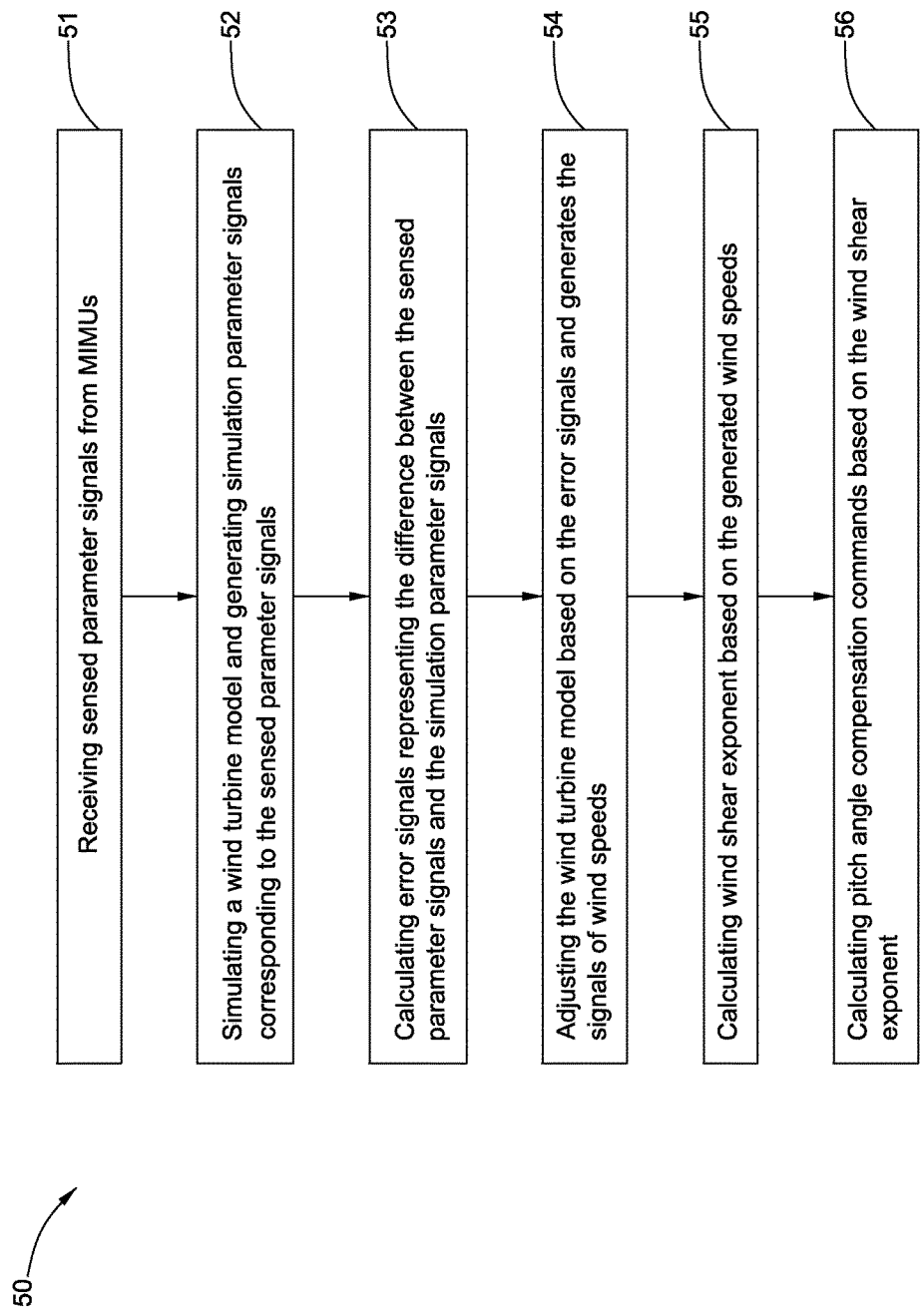
FIG. 5 is a flowchart of a control method of the wind turbine of FIG. 1, according to one embodiment of the present invention.

Referring to FIG. 5, a flowchart of an exemplary wind turbine control method 50 is shown. In at least some embodiments, the control system 30 of FIG. 3 applies this control method 50 to perform the rotor imbalance compensation process. In step 51, the parameter signals $M_0$, $M_1$, $M_2$, $M_3$ of the hub 140 and the blades 141, 142, and 143 are received from the corresponding MIMUs 110, 111, 112, 113. In some embodiments, the parameter signals of the hub 140 may not need to be sensed. In step 52, the wind turbine model 311 is simulated and used to generate the simulation parameter signals $M_{0\_sim}$, $M_{1\_sim}$, $M_{2\_sim}$, $M_{3\_sim}$ corresponding to the parameter signals $M_0$, $M_1$, $M_2$, $M_3$. In step 53, the error signals $\Delta M_0$, $\Delta M_1$, $\Delta M_2$, $\Delta M_3$ representing the difference between the parameter signals $M_0$, $M_1$, $M_2$, $M_3$ and the simulation parameter signals $M_{0\_sim}$, $M_{1\_sim}$, $M_{2\_sim}$, $M_{3\_sim}$ are calculated. In step 54, the wind turbine model 311 is adjusted according to the error signals $\Delta M_0$, $\Delta M_1$, $\Delta M_2$, $\Delta M_3$ and the wind turbine model 311 generates real wind speeds $V_0$, $V_1$, $V_2$, $V_3$. In step 55, the shear exponent α is calculated based on the generated real wind speeds $V_0$, $V_1$, $V_2$, $V_3$. In step 56, the three pitch angle compensation commands $\Delta\beta_1$, $\Delta\beta_2$, and $\Delta\beta_3$ respectively corresponding to the blades 141, 142, 143 are calculated based on the shear exponent α.

Figure 6:
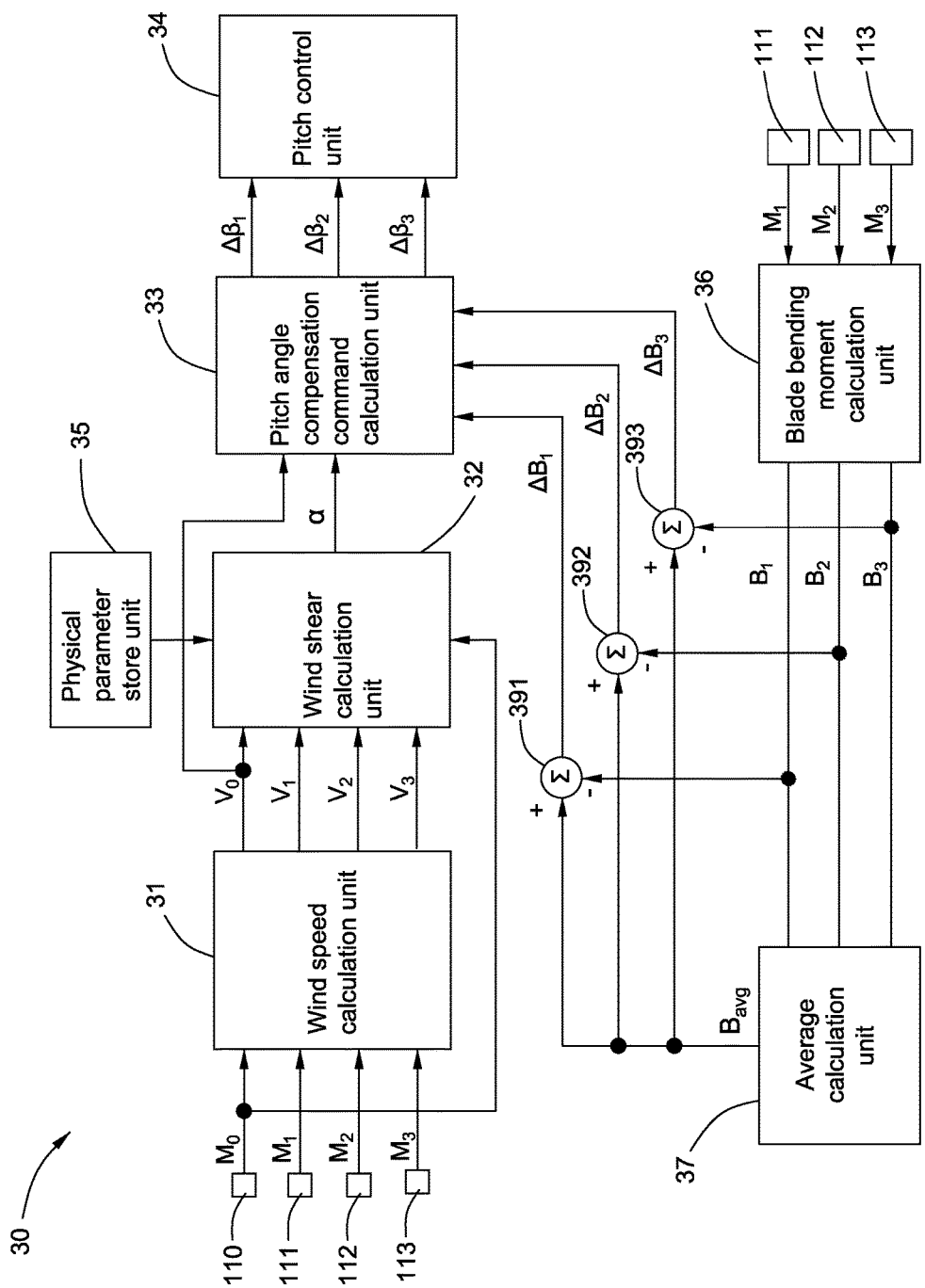
FIG. 6 is a control diagram of a control system of the wind turbine of FIG. 1, according to another embodiment of the present invention.

Referring to FIG. 6, a control diagram of a control system 30 of the wind turbine 10, according to another embodiment is shown. In comparison to the embodiment of FIG. 3, the embodiment of FIG. 6 further illustrates a blade bending moment calculation unit 36 and an average calculation unit 37. The blade bending moment calculation unit 36 provides three error signals $\Delta B_1$, $\Delta B_2$, $\Delta B_3$ of blade bending moment to the pitch angle compensation command calculation unit 33 for calculating the three pitch angle compensation commands $\Delta\beta_1$, $\Delta\beta_2$, and $\Delta\beta_3$. Namely, in this embodiment, the three pitch angle compensation commands $\Delta\beta_1$, $\Delta\beta_2$, and $\Delta\beta_3$ are calculated based on the combination of the shear exponent $\alpha$, the center average wind speed $V_0$, and the error signals $\Delta B_1$, $\Delta B_2$, $\Delta B_3$. In other embodiments, the shear exponent $\alpha$ can also combine other sensed or calculated data to calculate the pitch angle compensation commands $\Delta\beta_1$, $\Delta\beta_2$, and $\Delta\beta_3$. For example, some MIMUs may measure various loads including blade flapwise and edgewise bending moments and blade axial tensile load, and then all these load data in 3D-components can be applied to obtain related parameters, such as the peak load applied on the pitch bearings, for further calculating the pitch angle compensation commands $\Delta\beta_1$, $\Delta\beta_2$, and $\Delta\beta_3$ accordingly.

In this illustrated embodiment of FIG. 6, for generating the three error signals $\Delta\beta B_1$, $\Delta B_2$, $\Delta B_3$, the control system 30 further includes the average calculation unit 37, and three summation elements 391, 392, 393. The blade bending moment calculation unit 36 is used to calculate three blade bending moment values $B_1$, $B_2$, $B_3$ of the blades 141, 142, and 143 based on one or more of the sensed parameter signals $M_1$, $M_2$, $M_3$ respectively sensed from the MIMUs 111, 112, 113. The average calculation unit 37 is used to calculate an average blade bending moment value $B_{avg}$ of the three blade bending moment values $B_1$, $B_2$, $B_3$, namely in the three blade embodiment $B_{avg}=(B_1+B_2+B_3)/3$. The summation element 391 is used to obtain the error signals $\Delta B_1$ by subtracting the average blade bending moment value $B_{avg}$ from the blade bending moment value $B_1$, namely $\Delta B_1=B_1-B_{avg}$. The summation element 392 is used to obtain the error signals $\Delta B_2$ by subtracting the average blade bending moment value $B_{avg}$ from the blade bending moment value $B_2$, namely $\Delta B_2=B_2-B_{avg}$. The summation element 393 is used to obtain the error signals $\Delta B_3$ by subtracting the average blade bending moment value $B_{avg}$ from the blade bending moment value $B_3$, namely $\Delta B_3=B_3-B_{avg}$. In other embodiments, the three error signals $\Delta B_1$, $\Delta B_2$, $\Delta B_3$ can also be calculated through other appropriate algorithms. For example, the error signals $\Delta B_1$ is calculated by subtracting a predetermined desired blade bending moment value from the blade bending moment value $B_1$.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A control method for mitigating rotor imbalance on a rotor of a wind turbine, the rotor comprising a plurality of blades mounted on a hub, the method comprising:
    calculating wind speeds at the plurality of blades based at least on sensed parameter signals from micro inertial measurement units (MIMUs) mounted on each of the plurality of blades, comprising:
        simulating a wind turbine model for the wind turbine; and receiving sensed parameter signals from the MIMU of each of the plurality of blades;
        receiving corresponding simulation parameter signals from the wind turbine model;
        obtaining error signals representing the difference between the sensed parameter signals and the corresponding simulation parameter signals;
        adjusting the wind turbine model according to the error signals; and
        generating the wind speeds at the plurality of blades based on the adjusted wind turbine model;
    calculating a characteristic shear exponent based at least on the calculated wind speeds;
    calculating pitch angle compensation commands of the plurality of blades based at least on the calculated characteristic shear exponent; and
    adjusting the pitch angles of the plurality of blades based on the calculated pitch angle compensation commands.

2. The method of claim 1, further comprising:
    calculating a wind speed at a center of the hub based at least on sensed parameter signals of the hub from a MIMU mounted on the center of the hub;
    calculating the characteristic shear exponent further based on the calculated wind speed at the center of the hub.

3. The method of claim 1, wherein calculating pitch angle compensation commands of the plurality of blades based at least on the calculated characteristic shear exponent further comprises calculating the pitch angle compensation commands of the plurality of blades further based on an average wind speed of the rotor.

4. The method of claim 3, wherein the number of the plurality of blades is three, the relationship between the shear exponent $\alpha$ and wind speeds $V_0$, $V_1$, $V_2$, $V_3$ are $V_1=V_0*(h_1/h_0)^\alpha$, $V_2=V_0*(h_2/h_0)^\alpha$, $V_3=V_0*(h_3/h_0)^\alpha$, wherein $V_0$ is the average wind speed of the rotor, $V_1$, $V_2$, $V_3$ are the wind speeds at the three blades respectively, $h_0$ is a vertical height from a center of the hub to ground, and $h_1$, $h_2$, $h_3$ are vertical heights from the MIMUs of the blades to ground.

5. The method of claim 4, wherein the shear exponent $\alpha$ is calculated based on the relationship between the shear exponent $\alpha$ and the wind speeds $V_0$, $V_1$, $V_2$, $V_3$ by applying a least square algorithm.

6. The method of claim 4, wherein the vertical heights $h_1$, $h_2$, $h_3$ are calculated based on the known vertical height $h_0$ and a rotor angle representing the rotor position of the rotor, wherein the rotor angle parameter signal is sensed by a MIMU mounted on the center of the hub.

7. The method of claim 1, wherein the wind turbine model comprises:
    a wind load model for calculating wind load of the wind turbine and generating the wind speeds at the plurality of blades; and
    a blade dynamic model for simulating the plurality of blades based on the wind load model and generating the corresponding simulation parameter signals.

8. The method of claim 1, further comprising:
    calculating blade bending moment values of the plurality of blades based at least on the sensed parameter signals;
    calculating an average blade bending moment value of the blade bending moment values; obtaining error signals by subtracting the blade bending moment values from the average blade bending moment value respectively; and
    calculating the pitch angle compensation commands of the plurality of blades further based on the calculated error signals.

9. The method of claim 1, wherein the sensed parameter signals of the plurality of blades comprises acceleration signals, rotation speed signals, rotor position signals or combinations thereof.

10. A control method for mitigating rotor imbalance on a rotor of a wind turbine, the rotor comprising a plurality of blades mounted on a hub, the method comprising:

calculating wind speeds at the plurality of blades based at least on sensed parameter signals from micro inertial measurement units (MIMUs) mounted on each of the plurality of blades;

calculating a characteristic shear exponent based at least on the calculated wind speeds;

calculating blade bending moment values of the plurality of blades based at least on the sensed parameter signals;

calculating an average blade bending moment value of the blade bending moment values;

obtaining error signals by subtracting the blade bending moment values from the average blade bending moment value respectively;

calculating pitch angle compensation commands of the plurality of blades based at least on the calculated characteristic shear exponent and the calculated error signals; and adjusting the pitch angles of the plurality of blades based on the calculated pitch angle compensation commands.

* * * * *